(12) United States Patent
Ali et al.

(10) Patent No.: US 7,222,292 B2
(45) Date of Patent: *May 22, 2007

(54) METHODS AND SYSTEMS FOR DYNAMICALLY CREATING USER INTERFACES

(75) Inventors: Arish Ali, Bellevue, WA (US); Brian S. Aust, Redmond, WA (US); Paul S. Hellyar, Kirkland, WA (US); Joel K. Grossman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

This patent is subject to a terminal disclaimer.

(21) Appl. No.: 10/980,948
(22) Filed: Nov. 4, 2004

(65) Prior Publication Data

US 2005/0066270 A1    Mar. 24, 2005

Related U.S. Application Data

(63) Continuation of application No. 09/620,744, filed on Jul. 20, 2000, now Pat. No. 6,920,607.

(60) Provisional application No. 60/170,958, filed on Dec. 15, 1999.

(51) Int. Cl.
G06F 15/00 (2006.01)
G06F 17/00 (2006.01)

(52) U.S. Cl. ............... 715/501.1; 715/513; 709/219
(58) Field of Classification Search ............ 715/501.1, 715/513; 709/219, 223
See application file for complete search history.

(56) References Cited

U.S. PATENT DOCUMENTS

| | | | |
|---|---|---|---|
| 5,835,712 A | 11/1998 | DuFresne | |
| 5,968,119 A | 10/1999 | Stedman et al. | |
| 5,987,513 A | 11/1999 | Prithviraj et al. | |
| 6,342,907 B1 | 1/2002 | Petty et al. | |
| 6,476,833 B1 | 11/2002 | Moshfeghi | |
| 6,748,569 B1 | 6/2004 | Brooke et al. | |
| 6,785,866 B1 | 8/2004 | Lewis et al. | |
| 6,820,235 B1* | 11/2004 | Bleicher et al. | 715/501.1 |

OTHER PUBLICATIONS

BlueGill Technologies Harness XML to Bridge Information Gap and Bolster Customer Relationships, PR Newswire, New York, Apr. 12, 1999, pp. 1-2.*

(Continued)

*Primary Examiner*—William Bashore

(57) ABSTRACT

A data presentation system dynamically generates and renders a user interface (UI) in the form of a Hypertext Markup Language (HTML) document. Extensible Markup Language (XML) data files contain data that defines the UI. The XML data is maintained independently of any application and/or computing system's settings and controls that define the presentation of the UI. The XML data files also have reference links to secondary data files that contain data further defining the UI. The UI is dynamically generated when an application invokes the XML data files. The HTML document incorporates the data from both the XML data files and from the secondary data files when rendering the UI.

16 Claims, 11 Drawing Sheets

OTHER PUBLICATIONS

Bluestone Software Contributes Freeware To XML/Java Movement, Business Wire, New York, Feb. 2, 1999, pp. 1-3.*

Lubell, Joshua, "Structured Markup on the Web," Markup Languages, US, Mit Press, Cambridge, MA, vol. 1, No. 3, 1999, pp. 7-22.

Esposito, D., "A Brand New Web Look for Your Folders," MSDN Online Library, May 1999, msdn.Microsoft.com. (11 pages).

DiLascia, P., "C++ Q&A," Microsoft Systems Journal, Nov. 1999, www.microsoft.com, (7 pages).

Sandolo, S. et al., "JAD System Architecture," Java Administration System Documentation, Aug. 30, 1997, server-esng.dibe.unige.it (8 pages).

"Disk Drive with Embedded Hyper-Text Markup Language Server," IBM Technical Disclosure Bulletin, IBM Corp., vol. 38, No. 12, Dec. 1995.

Sall, K., "Doing It With XML, Part 1," Web Developer's Virtual Library—Tutorials, Apr. 1999, wdvl.com, (29 pages).

Sol, S., "Introduction to XML For Web Developers,—Part Three: The DTD," Web Developer's Virtual Library—Tutorials, May 3, 1999, wdvl.com, (18 pages).

* cited by examiner

METHODS AND SYSTEMS FOR DYNAMICALLY CREATING USER INTERFACES

RELATED APPLICATIONS

This application is a continuation of and claims priority to U.S. patent application Ser. No. 09/620,744 entitled "Methods and Systems for Dynamically Creating User Interfaces" filed Jul. 20, 2000 now U.S. Pat. No. 6,920,607, to Ali et al., the disclosure of which is incorporated by reference herein.

U.S. patent application Ser. No. 09/620,744 claims priority from U.S. Provisional Application Ser. No. 60/170,958, filed Dec. 15, 1999, the disclosure of which is incorporated by reference herein.

TECHNICAL FIELD

This invention relates to the systems and methods for implementing an extensible, dynamically created user interface. Specifically, the presentation of a control panel user interface for a computing system's settings and controls is dynamically created using Web-based technology.

BACKGROUND

Access to a computing system's settings and controls are typically presented to a user via a collection of individual user interactive applications collected for presentation within a control panel user interface. The computing system's settings and controls are coded with a programmable means for user interaction at the user interface.

FIG. 1 shows a computing system 100 having a conventional control panel user interface. Computing device 100 has a display 110 and a base 112. The base 112 contains memory 114 that stores systems applications 116 and 118 ($A_1$-$A_N$).

A user interface (UI) 120 is shown displayed on the computing device display 110. In FIG. 1, the UI 120 is embodied as the control panel 130 in the familiar "Windows"-based operating system from Microsoft Corporation. Control panel 130 presents a user with a multitude of selectable application control icons 132($I_1$-$I_N$) that expose both simple and complex system configuration settings and controls at the same level. Each application icon 132 is independently associated with a system application 118 within the computing device memory 114 (e.g., icon $I_1$ is the independent UI associated with application $A_1$, and so forth).

The presentation of control panel 130 is controlled by system application 116. Each systems application 118 is associated with the presentation of a control panel UI, and is also integrated with the presentation of the control panel 130 in conjunction with the control panel system application 116.

From a user standpoint, multiple unrelated system control panels make it difficult for a user to locate a system setting or control that he or she wants to change. Furthermore, related settings and controls are separated into different control panels, causing a user to have to search the various control panels to accomplish a set of related settings and control tasks.

Accordingly, there is a need for control panel UIs that enables a user to easily navigate a computing system's settings and controls. Additionally, there is a need for an extensible UI presentation technique that enables a developer to easily design, modify, and replace control panel UIs.

New computing display and data presentation techniques have developed as a result of the Internet and the fast-paced technological advancements in computing and user interaction. One such presentation and display technology utilized by developers of Internet Web pages is Hypertext Markup Language (HTML) in conjunction with Extensible Markup Language (XML). Many readers will be familiar with HTML and XML. However, to provide additional background, the following discussion presents an overview of the conventional HTML and XML technologies.

Hypertext Markup Language

Hypertext Markup Language (HTML) is a display language for presenting data to an end user in a visual presentation. Internet Web pages are commonly written in HTML and may include text, images, sound, video, active code, and so forth. Data binding is an aspect of Dynamic HTML (DHTML) that allows processing individual items of data from an information source into an HTML display, thus allowing HTML to be used as a template for displaying the data, while creating an extensible and interactive Web page. DHTML allows a developer to individually manipulate any HTML page element at any time.

Making simple updates to an HTML page, such as changing the color of text after a Web page has been rendered for display, typically requires reloading the entire page to account for the one desired change. With DHTML, however, every element within the page is independently dynamic and an individual element (text or graphics) can be changed without having to reload the entire page.

Extensible Markup Language

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general purpose language for representing structured data without including information that describes how to format the data for display.

Internet Web-based data viewing is typically enabled via XML data that is stored on a server at an Internet site. The XML data is transferred to a client device upon request and rendered for viewing with HTML. An XML document does not by itself specify whether or how its data should be displayed. The XML data is merely the factual information to be displayed.

An unique attribute of utilizing XML structured data is that the data is separated from the HTML presentation to a user. While HTML specifies how to display data in an Internet browser, XML only defines the content data to be displayed. HTML utilizes tags to specify how an Internet browser will display the data (i.e., bold or italic). In XML, tags are only used to describe the data (i.e., a title name), and not to specify how the data will be displayed. To describe how the data will be presented, XML references a separate application or stylesheet.

Extensible Stylesheet Language

Extensible Stylesheet Language (XSL) provides both the semantic and structural independence for presenting the content of XML data. A style sheet contains a template of the desired structure for data presentation, and identifies the data in an XML source document to insert into the template. Thus, the XML data is separated from the presentation, allowing both the grammar and the structure of the XML source document to be independent of the presentation language and the structure.

XSL style sheets contain instructions for presenting the data in an XML document in a format such as HTML. XML enables data to be processed and displayed by applying different stylesheets and applications while separating the data from the presentation and the process. The separation of the data from the presentation allows for a seamless integration of data from diverse sources. This further allows data encoded in XML to be easily exchanged on-line and delivered over the Internet to a client device.

FIG. 2 shows the components for transforming XML-based data into an HTML display using XSL. The HTML presentation system 200 includes an Internet server 202 and a requesting client device 204. The Internet server 202 includes XML data 210, an XSL template 212, and an XSL processor 214. The XML data 210 is processed with the XSL template file 212 at the XSL processor 214 to generate and present an HTML document 216 at the client device 204.

XML Structure

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

Namespaces in XML structured data qualify element names in a recognizable manner to avoid conflicts between elements with the same name. Namespaces ensure that element names do not conflict, and they clarify who defined which term. They do not give instructions on how to process the elements, but simply keep the names straight. Thus, XML namespaces convey meaningful information by associating a descriptive namespace with a tag name.

Within an XML document, namespace declarations occur as attributes of start tags. Namespace declarations are of the form "xmlns:[prefix]=[uri]". A namespace declaration indicates that the XML document contains element names that are defined within a specified namespace or schema. A "prefix" is an arbitrary designation that will be used later in the XML document as an indication that an element name is a member of the namespace declared by a universal resource indicator (uri). The prefix is valid only within the context of the specific XML document. A uri is either a path to a document describing a specific namespace or schema, or a globally unique identifier of a specific namespace or schema. A uri is valid across all XML documents. Namespace declarations are "inherited", which means that a namespace declaration applies to the element in which it was declared as well as to all elements contained within that element.

Namespace inheritance within an XML document allows non-qualified names to use "default" namespaces. Default namespaces are explicitly declared as attributes of start tags. Default namespace declarations are of the form "xmlns=[uri]". Note that the declaration of a default namespace is equivalent to the declaration of a non-default namespace but the prefix is omitted. A namespace specification within an XML document is said to have a "scope" which includes all child nodes beneath the namespace specification.

An example of XML code follows:

```
<trans:orders xmlns:person="http://www.schemas.organization/people"
        xmlns:dsig="http://www.dsig.org"
        xmlns:trans="http://www.schemas.org/transactions">
    <trans:order>
        <trans:sold-to>
            <person:name>
                <person:last-name>Layman</person:last-name>
                <person:first-name>Andrew</person:first-name>
            </person:name>
        </trans:sold-to>
        <trans:sold-on>1997-03-17</trans:sold-on>
        <dsig:digital-signature>1234567890</dsig:digital-signature>
    </trans:order>
</trans:orders>
```

This code includes three XML namespace declarations that are each designated with "xmlns". The declarations include a prefix (e.g. "person", "trans", and "dsig") and the expanded namespace to which each prefix refers (e.g. "http://www.schemas.org/people", "http://www.schemas.org/transactions", and "http://www.dsig.org", respectively). This code tells any reader that if an element name begins with "dsig" its meaning is defined by the "http://www.dsig.org" namespace. Similarly, elements beginning with the "person" prefix have meanings defined by the "http://www.schemas.org/people" namespace and elements beginning with the "trans" prefix have meanings defined by the "http://www.schemas.org/transactions" namespace.

It is important to note that another XML document that incorporated elements from any of the namespaces included in this sample might declare prefixes that are different from those used in this example. As noted earlier, prefixes are arbitrarily defined by the document's author and have meaning only within the context of the specific element of the specific document in which they are declared. Tags from multiple namespaces can be mixed to accommodate data coming from multiple sources. With namespaces, two elements can exist in the same XML-based document, but can refer back to two different schemas, uniquely qualifying their semantics.

XML Schemas

XML accommodates an infinite number of database schemas and elements referenced in one XML document can be defined in different schemas. XML schema are typically implemented within a Web browser such as Internet Explorer from Microsoft Corporation to provide support for coinciding sub-sets of XML data. An XML schema specifies the structure of an XML document and the constraints on the document's content.

Specifically, a schema defines the elements that can appear within an XML document and the attributes that can be associated with an element. While defining the structure of an XML document, a schema also defines which elements are child elements of others, the sequence in which the child elements can appear, and the number of child elements. A schema further defines whether an element is empty or can include text, as well as defining default values for attributes. Overall, a schema is utilized to validate the content of an XML document and to determine whether an XML document is a valid instance of the grammar expressed by the schema.

Within each schema, a "dictionary" of element names is defined. The dictionary of element names defined by a schema is referred to as a "namespace." Within an XML document, element names are qualified by namespace identifiers. When qualified by a namespace identifier, a tag name appears in the form "[namespace]:[tagname]". This model enables the same element name to appear in multiple schemas, or namespaces, and for instances of these duplicate element names to appear in the same XML document without colliding. Start tags can declare an arbitrary number of "attributes" which declare "property values" associated with the element being declared. Attributes are declared within the start tag using the form "<[tagname] [attribute1], [attribute2] . . . , [attributeN]>", where attribute1 through attributeN are declarations of an arbitrary number of tag attributes. Each attribute declaration is of the form "[attributeName]=[attributeValue]" where each attribute is identified by a unique name followed by an "=" character, followed by the value of the attribute.

A schema is primarily the formal specification of the elements and attributes allowed within a particular class of XML document, and the schema specifies how those elements and attributes are related to each other. Elements and attributes are defined in an XML schema document by specifying an <ElementType . . . > and <Attribute Type . . . >, respectively. These provide the definition and type of the element or attribute. An instance of an element or an attribute is declared using <element . . . > or <attribute . . . > tags. An example of an XML schema is shown following:

```
<?xml version="1.0"?>
<Schema xmlns="schemas-microsoft-com:XML-data">
    <ElementType name="title" />
    <ElementType name="author" />
    <ElementType name="pages" />
    <ElementType name="book" model="closed">
        <element type="title" />
        <element type="author" />
        <element type="pages" />
        <AttributeType name="copyright" />
        <attribute type="copyright" />
    </ElementType>
</Schema>
```

In this example, there are four <ElementType> defining elements: "title," "author," "pages," and "book." Within the ElementType for "book," the content model for a book can be declared. Each book contains "title," "author," and "pages" elements using the <element> with a type attribute that references the ElementType. An <AttributeType> for the copyright attribute can also be defined and then its usage declared using the <attribute> element with a type attribute that references its definition.

The definition of the copyright attribute is contained within the ElementType for "book." Attribute definitions are distinct from ElementType definitions in that they can be declared within the scope of an ElementType, allowing different element types to declare attributes of the same name but with potentially different meaning. <AttributeType> elements can be declared globally by placing them outside of the context of an ElementType. In this way, multiple elements can share the definition of a common attribute without having to redeclare the AttributeType within each ElementType.

SUMMARY

Methods and systems for dynamically creating user interfaces are described herein.

In an implementations, a data presentation system utilizes independent data file(s) as a way to define user interfaces (UIs) that are extensible, easy to redesign, and to update. The data presentation system separates a computing system's settings applications from the user interface (UI) used to set the system settings. This allows a UI to be dynamically modified simply by changing the description of the UI in the independent data file(s).

The system architecture includes a namespace navigation architecture that allows developers to access a computing system's settings and controls without having to know the details of the corresponding system files. System files' details include the system files' physical location, file permissions, and file names. Utilizing a namespace navigation architecture, one can simply refer to a system setting or control and navigate directly to it. This is essentially creating a URL (universal resource locator) to navigate and organize system resources.

In one implementation, the data presentation system dynamically generates a Hypertext Markup Language (HTML) user interface. The HTML user interface is generated with independent Extensible Markup Language (XML) data files containing data that defines the UI. The XML data files also contain namespace reference links to secondary and independent data files containing data that further defines the UI. The data presentation system renders the HTML user interface for display, incorporating the data from both the XML data files and from the secondary data files, by invoking the XML data files only.

BRIEF DESCRIPTION OF THE DRAWINGS

The same numbers are used throughout the drawings to reference like features and components.

DETAILED DESCRIPTION

The data presentation system and methods described herein separates a displayable user interface from a computing system's applications and the system's settings and controls that define the presentation of the user interface. By utilizing independent data files, a user interface (UI) can be dynamically modified simply by changing the description of the UI in the independent data files. Thus, the UI is extensible, easy to redesign, update, or extend.

The data presentation system utilizes Internet Web-based technology on an independent computing device to dynamically generate a displayable document. Dynamically displaying a Hypertext Markup Language (HTML) document generated with Extensible Markup Language (XML) data facilitates incorporating secondary and independent document defining data into the document when displayed.

Exemplary Computing Device

Figure 1:
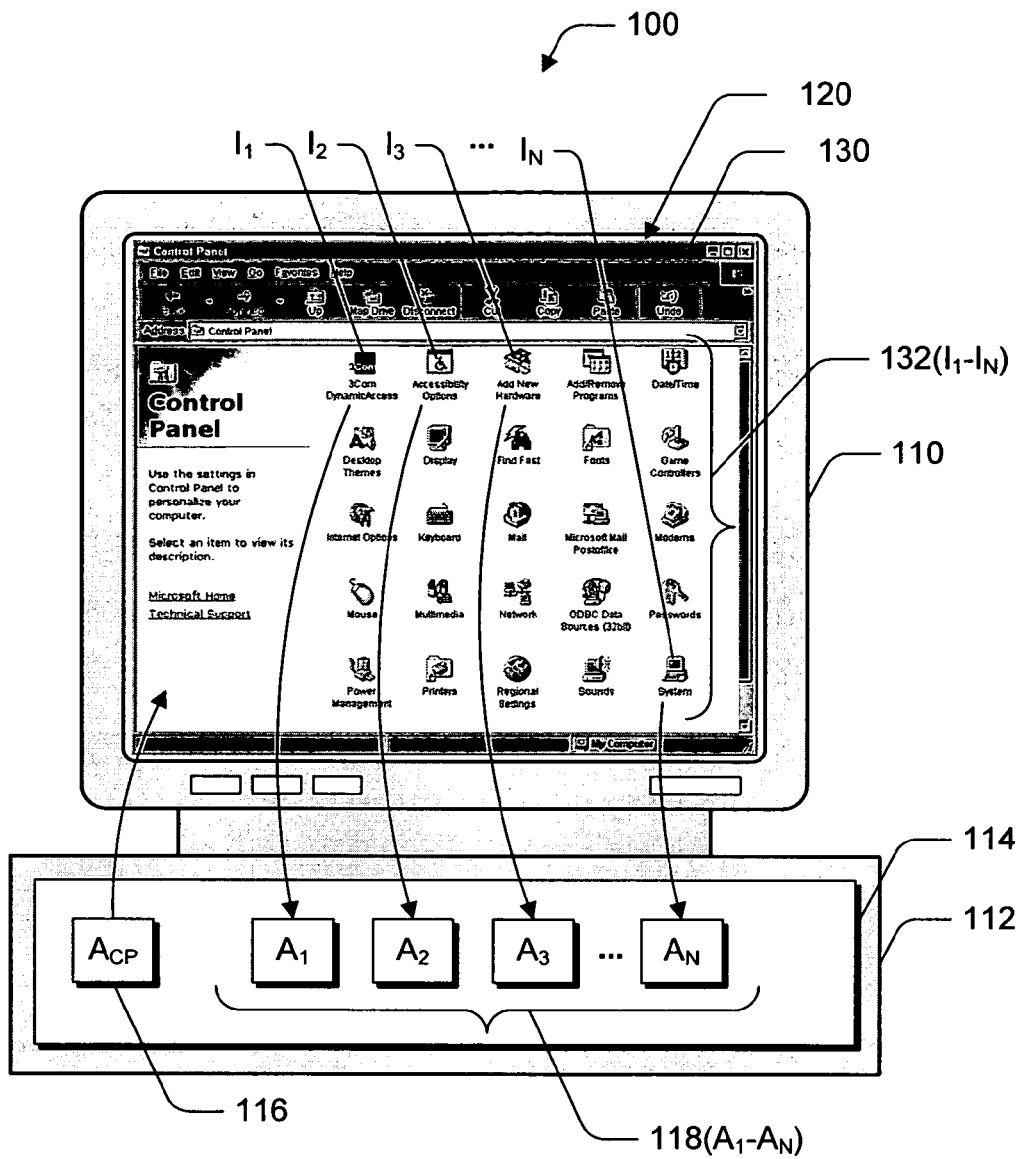
FIG. 1 is a block diagram that illustrates a computing device displaying a user interface.
Figure 2:
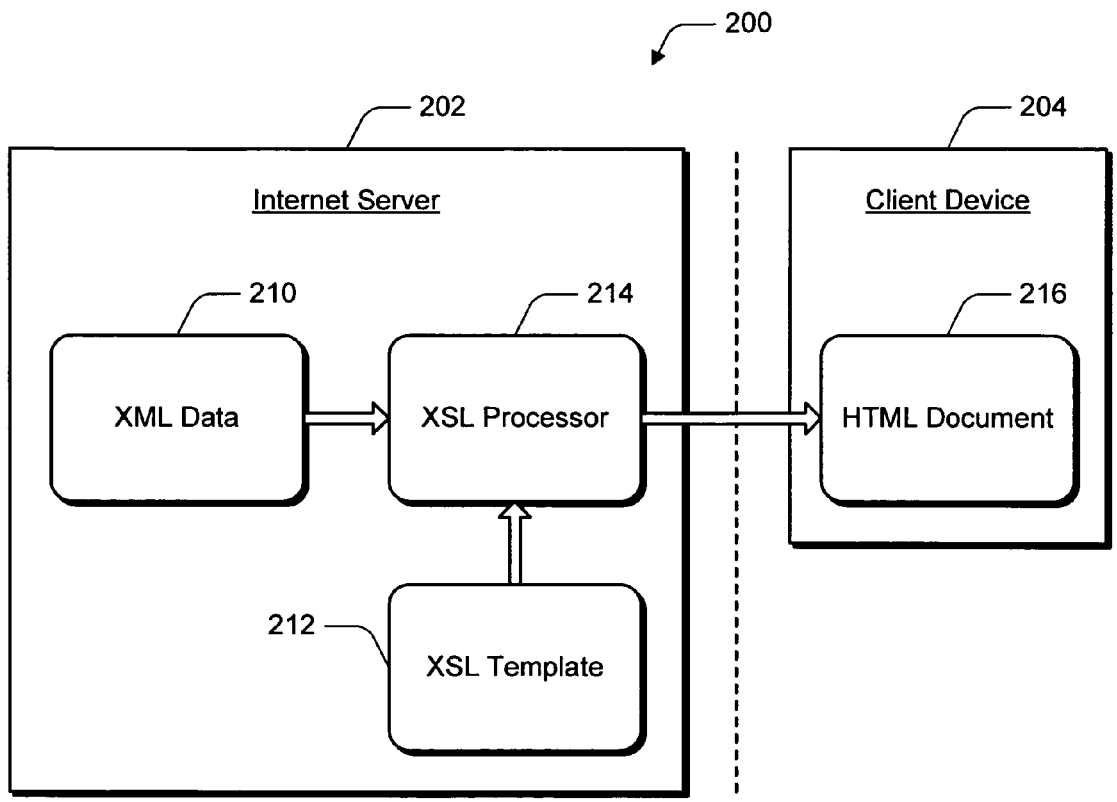
FIG. 2 is a block diagram that illustrates an Internet server providing data for presentation on an Internet browser at a client device.
Figure 3:
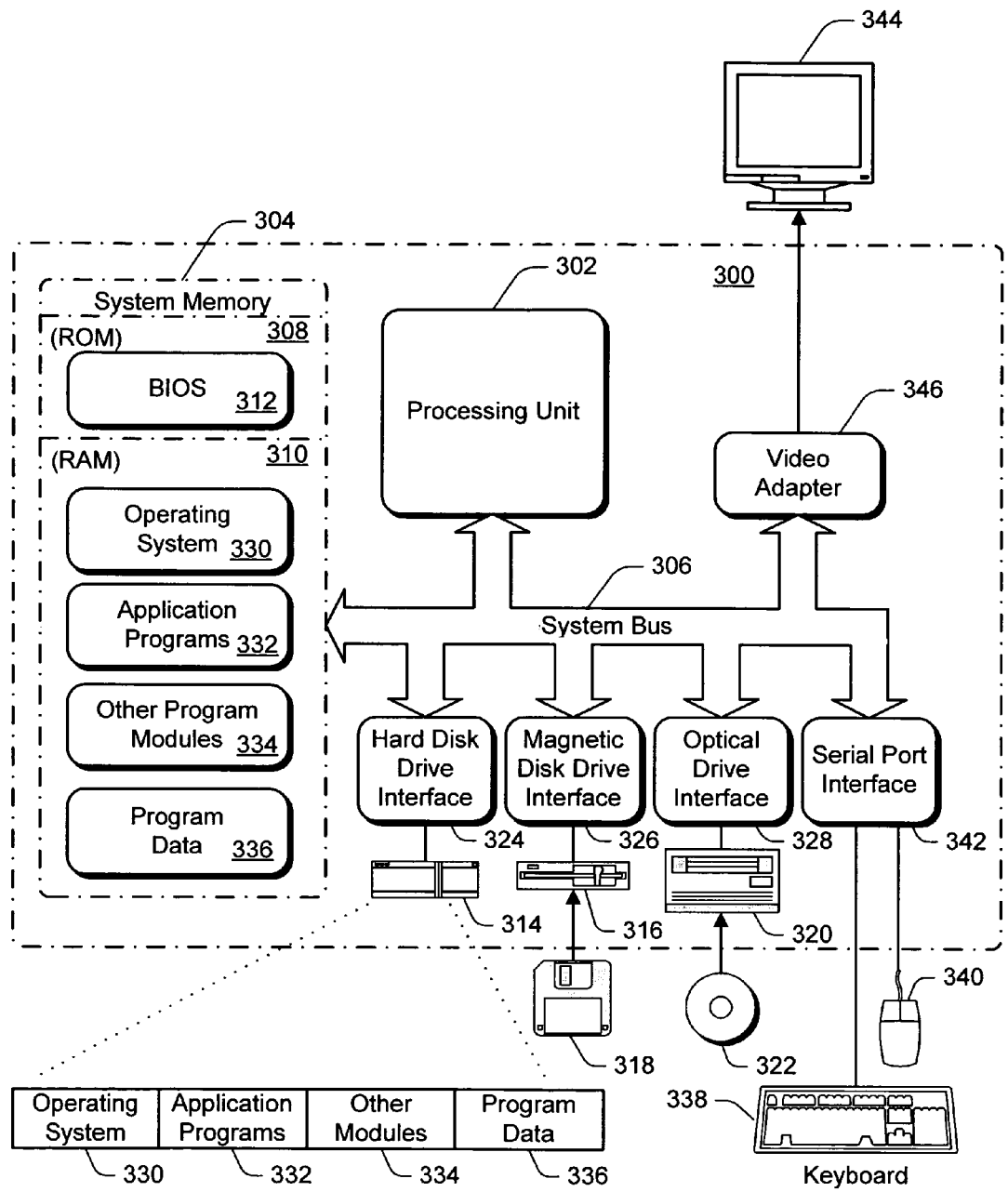
FIG. 3 is a block diagram of an exemplary computing device.

FIG. 3 illustrates an example of an independent computing device 300 that can be used to implement the components of a data presentation system. Computing device 300 includes one or more processors or processing units 302, a system memory 304, and a bus 306 that couples the various system components including the system memory 304 to processors 302. The bus 306 represents one or more of any of several types of bus structures, including a memory bus or memory controller, a peripheral bus, an accelerated graphics port, and a processor or local bus using any of a variety of bus architectures. The system memory 304 includes read only memory (ROM) 308 and random access memory (RAM) 310. A basic input/output system (BIOS) 312, containing the basic routines that help to transfer information between elements within the computing device 300 is stored in ROM 308.

Computing device 300 further includes a hard drive 314 for reading from and writing to one or more hard disks (not shown). Some computing devices can include a magnetic disk drive 316 for reading from and writing to a removable magnetic disk 318, and an optical disk drive 320 for reading from or writing to a removable optical disk 322 such as a CD ROM or other optical media. The hard drive 314, magnetic disk drive 316, and optical disk drive 320 are connected to the bus 306 by a hard disk drive interface 324, a magnetic disk drive interface 326, and a optical drive interface 328, respectively. Alternatively, the hard drive 314, magnetic disk drive 316, and optical disk drive 320 can be connected to the bus 306 by a SCSI interface (not shown).

The drives and their associated computer-readable media provide nonvolatile storage of computer-readable instructions, data structures, program modules and other data for computing device 300. Although the exemplary environment described herein employs a hard disk 314, a removable magnetic disk 318, and a removable optical disk 322, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on ROM 308, RAM 310, the hard disk 314, magnetic disk 318, or optical disk 322, including an operating system 330, one or more application programs 332, other program modules 334, and program data 336. In some computing devices 300, a user might enter commands and information into the computing device 300 through input devices such as a keyboard 338 and a pointing device 340. Other input devices (not shown) may include a microphone, joystick, game pad, satellite dish, scanner, or the like. In some instances, however, a computing device might not have these types of input devices. These and other input devices are connected to the processing unit 302 through an interface 342 that is coupled to the bus 306. In some computing devices 300, a monitor 344 or other type of display device might also be connected to the bus 306 via an interface, such as a video adapter 346. Some devices, however, do not have these types of display devices. In addition to the monitor 344, computing devices 300 might include other peripheral output devices (not shown) such as speakers and printers.

Generally, the data processors of computing device 300 are programmed by means of instructions stored at different times in the various computer-readable storage media of the computer. Programs and operating systems are typically distributed, for example, on floppy disks or CD-ROMs. From there, they are installed or loaded into the secondary memory of a computing device 300. At execution, they are loaded at least partially into the computing device's primary electronic memory. The computing devices described herein include these and other various types of computer-readable storage media when such media contain instructions or programs for implementing the steps described below in conjunction with a microprocessor or other data processor. The service system also includes the computing device itself when programmed according to the methods and techniques described below.

For purposes of illustration, programs and other executable program components such as the operating system are illustrated herein as discrete blocks, although it is recognized that such programs and components reside at various times in different storage components of the computing device 300, and are executed by the data processor(s) of the computer.

Data Presentation System

Figure 4A:
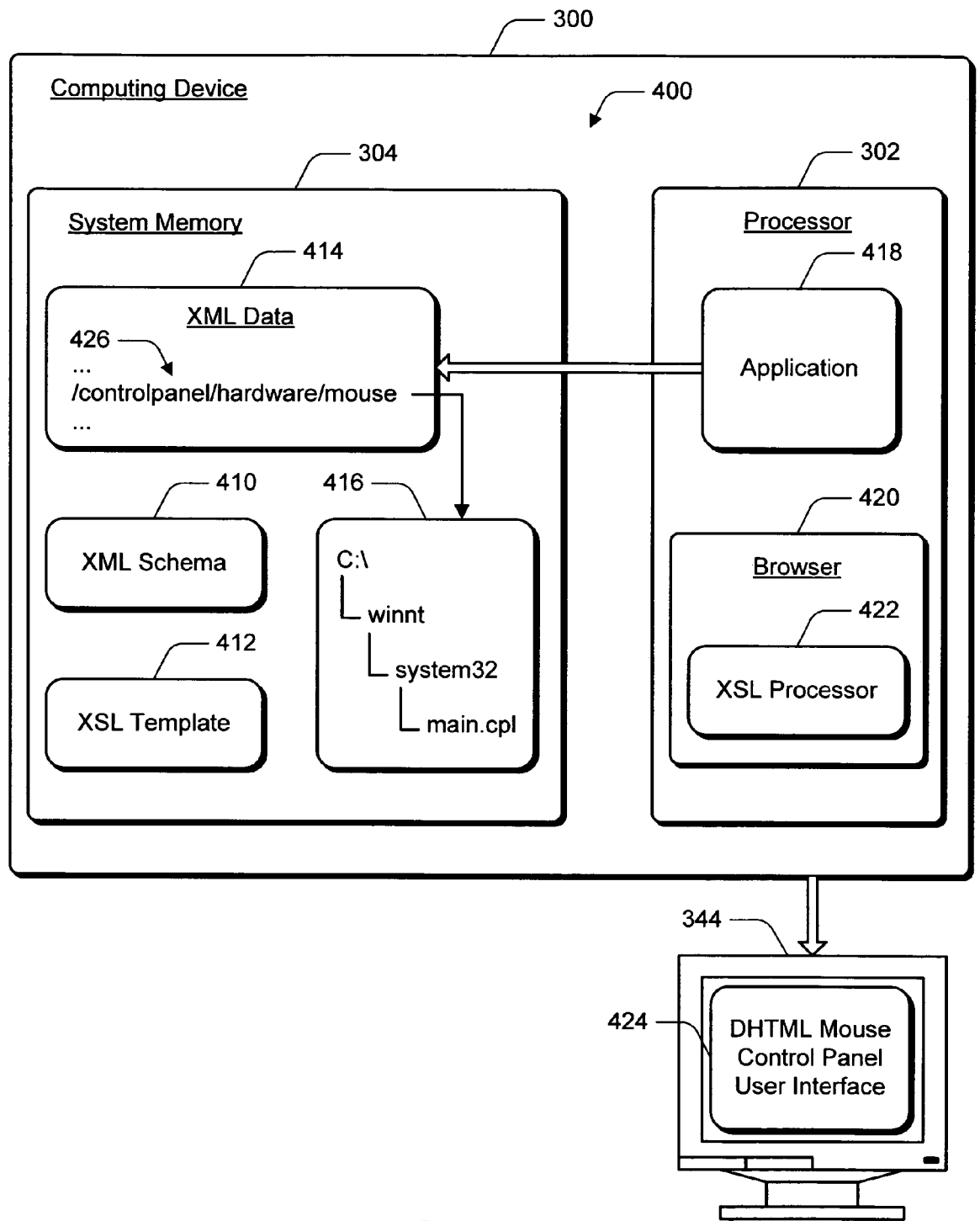
FIGS. 4A, 4B, 4C, and 4D are block diagrams illustrating an exemplary data presentation system that is implemented by the computing device shown in FIG. 3.
Figure 4B:
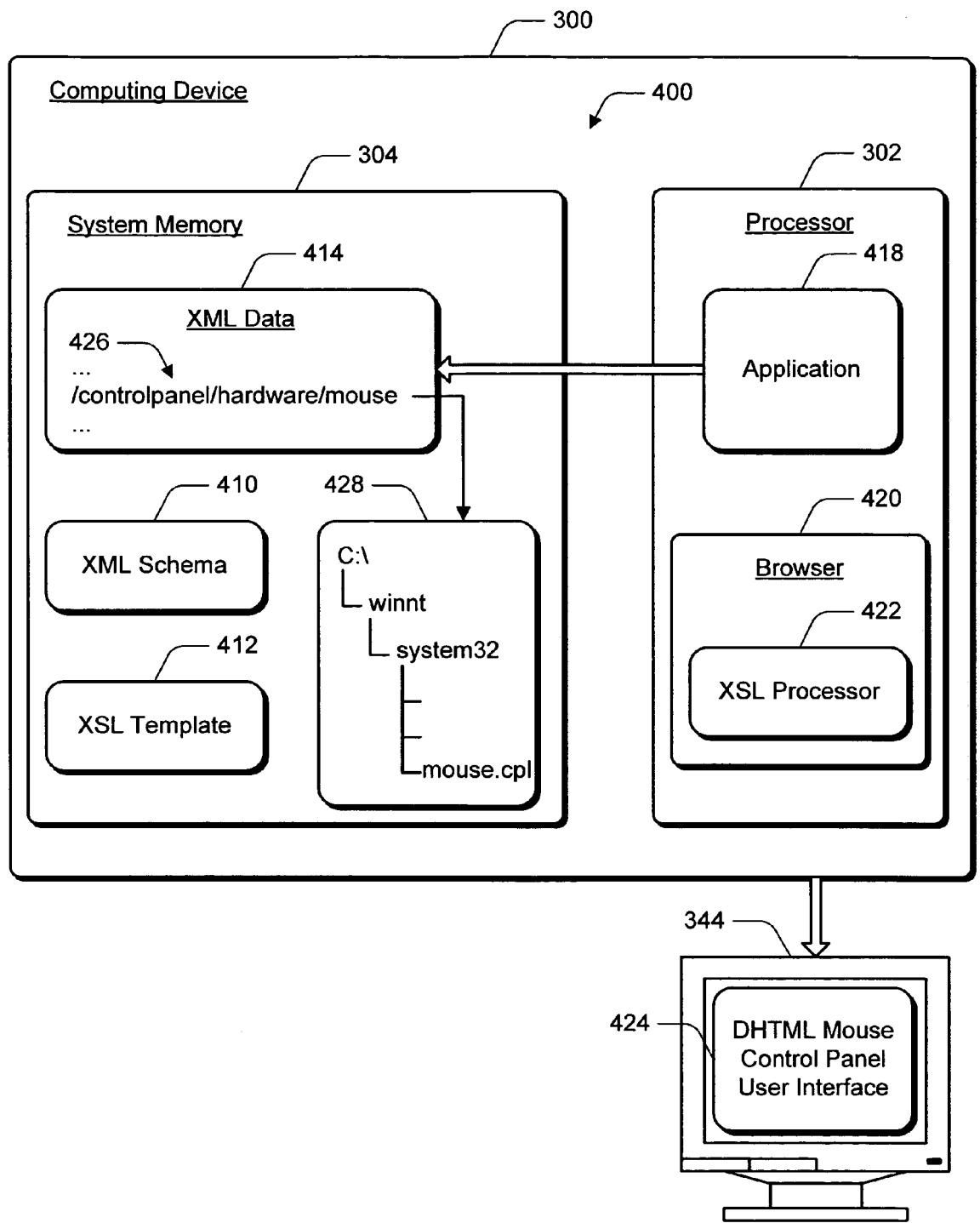

FIGS. 4A and 4B show the components of a data presentation system 400 implemented at the computing device 300 of FIG. 3. Computing device 300 has a processor 302, a system memory 304 (or other memory such as a hard disk, a removable magnetic disk, and/or a removable optical disk as shown in FIG. 3), and a display 344. The memory 304 retains XML schema 410, an XSL template 412, XML data 414, and a mouse control panel file 416 located in memory 304 at a file space location c:\winnt\system32\main.cpl. The mouse control panel file 416 contains mouse control panel UI settings and controls.

The processor 302 is shown executing an application 418 and a browser 420. In response to the execution of application 418, browser 420 loads the XML data 414 and checks the data file against XML schema 410 to ensure that the XML data 414 is a valid representation of the schema's specified content. The browser 420 then processes the XML data 414 with the XSL template 412 at an XSL processor 422 located within browser 420 to render a DHTML document 424 on the display 344. An example of an XSL processor 422 is a dynamically linked library named MSXML.DLL available in the Internet Explorer browser from Microsoft Corporation. A dynamically linked library (DLL) is a binary file that acts as a shared library of functions that can be used simultaneously by multiple applications. DLLs are used for a variety of reasons, primarily for either sharing common code between different executable files or breaking an application into separate components, thus allowing for easy upgrades of the application.

In FIG. 4A, application 418 invokes XML data 414 that contains a namespace navigation link 426 to the mouse control panel file 416 located in memory 304 at c:\winnt\system32\main.cpl. The browser 420 processes the XML data 414 with the XSL template 412 at the XSL processor 422 to render the DHTML document 424 that forms a mouse control panel UI on the display 344. The DHTML document 424 forming the mouse control panel UI incorporates the mouse control panel settings and controls located in mouse control panel file 416.

FIG. 4A demonstrates that a DHTML document 424 is created for display and incorporates data from the file 416 by simply invoking the XML data 414 that contains the namespace navigation link 426 to the file 416. Namespace navigation link 426, /controlpanel/hardware/mouse, is a reference link of navigable nodes that is part of a namespace navigation architecture that describes a system's settings and controls using simple, descriptive, and easy to understand terminology. It is not clear from the file path, c:\winnt\system32\main.cpl, that this points to a mouse control panel file 416. The namespace navigation link 426, however, provides a user with an intuitive understanding that a mouse control panel file can be accessed via the namespace path, /controlpanel/hardware/mouse.

A particular advantage of utilizing a namespace navigation architecture is that it provides a consistent and understandable interface means for application developers and independent software vendors (ISVs) to use and invoke a particular system's settings and controls. In the illustrated example of FIG. 4A, an application developer desiring to display a user interface with mouse settings and controls would not have to know the specific file location for the mouse control panel file 416 in memory 304 to include the settings and controls in a mouse control panel user interface (e.g., DHTML document 424).

The namespace navigation architecture allows developers and ISVs to access a computing system's settings and controls without having to know the details of the corresponding system files. System files' details include the system files' physical location, file permissions, and even file names. By referencing the namespace navigation architecture (i.e., the reference link 426, /controlpanel/hardware/mouse), one can refer to a data file (i.e., mouse control panel file 416) containing user interface settings and controls and navigate directly to it without having to know the file specific details. This is essentially creating a URL (universal resource locator) to navigate system resources.

In FIG. 4B, a new mouse control panel file 428 supersedes the previous mouse control panel file 416 and is located in memory 304 at a file space location c:\winnt\system32\mouse.cpl. The new file 428 contains new mouse control panel UI settings and controls that application 418 incorporates into the mouse control panel UI, DHTML document 424.

If application 418 had originally directly referenced the previous file 416, application 418 would have to be reprogrammed to invoke the new mouse control panel file 428 at the new location in memory 304. The ramifications of relocating data from an existing file to a new file at a new location in memory during data and application development, and during upgrades, are compounded for each application and system component referencing an existing file.

In contrast, according to the data presentation system described herein, the only change needed from a development standpoint is a simple text edit in XML data 414 so that the namespace hierarchy link 426 now references the new mouse control panel file 428. Developing the new mouse control panel file 428 and relocating the file to a new location in memory 304 does not require any reprogramming of application 418, or of any other proprietary or third party applications invoking the XML data 414.

In the implementation, the XML data 414 is configured and stored in a manner that describes a namespace according to the specified content in the XML schema 410. All nodes in a namespace have a single parent node, except for the root node which does not have a parent node. Thus, the hierarchy of a namespace reference link is described through the physical structure of the XML data document itself. The purpose of the namespace navigation architecture illustrated in FIGS. 4A and 4B is to derive the contents of a displayable user interface with a simple navigation hierarchy.

One advantage of the described architecture is that XML schemas and XML data files are extensible and can be easily modified. A developer can add elements and attributes to a schema document and/or data file to support a particular user interface presentation. Utilizing XML, XSL, and DHTML allows a displayable UI to appear more like a Web page and further allows the incorporation of Web-like controls with which Internet users are already intuitively familiar. In addition, the UI can be rendered with dynamically generated help text, tooltips, and the like.

Figure 4C:
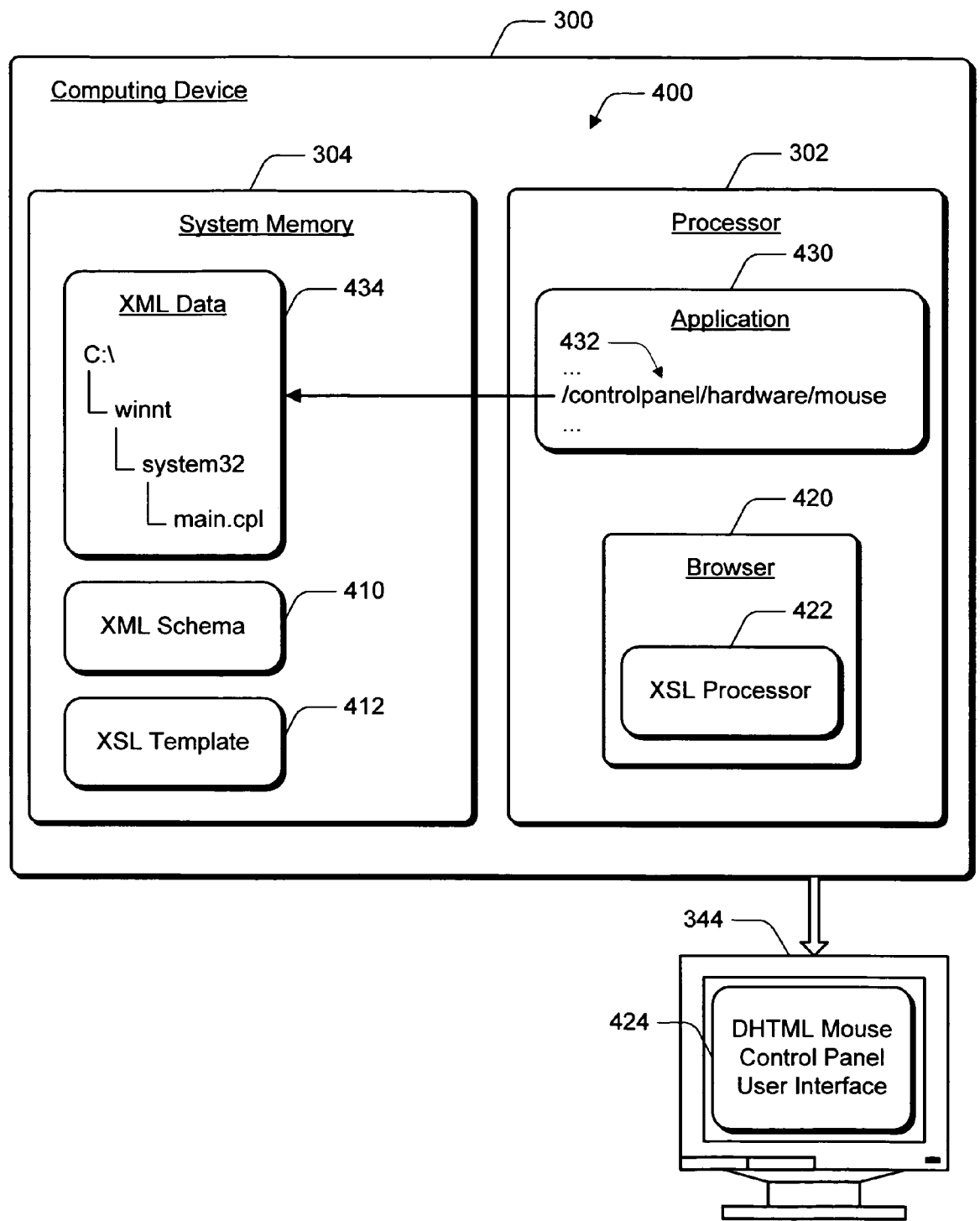
Figure 4D:
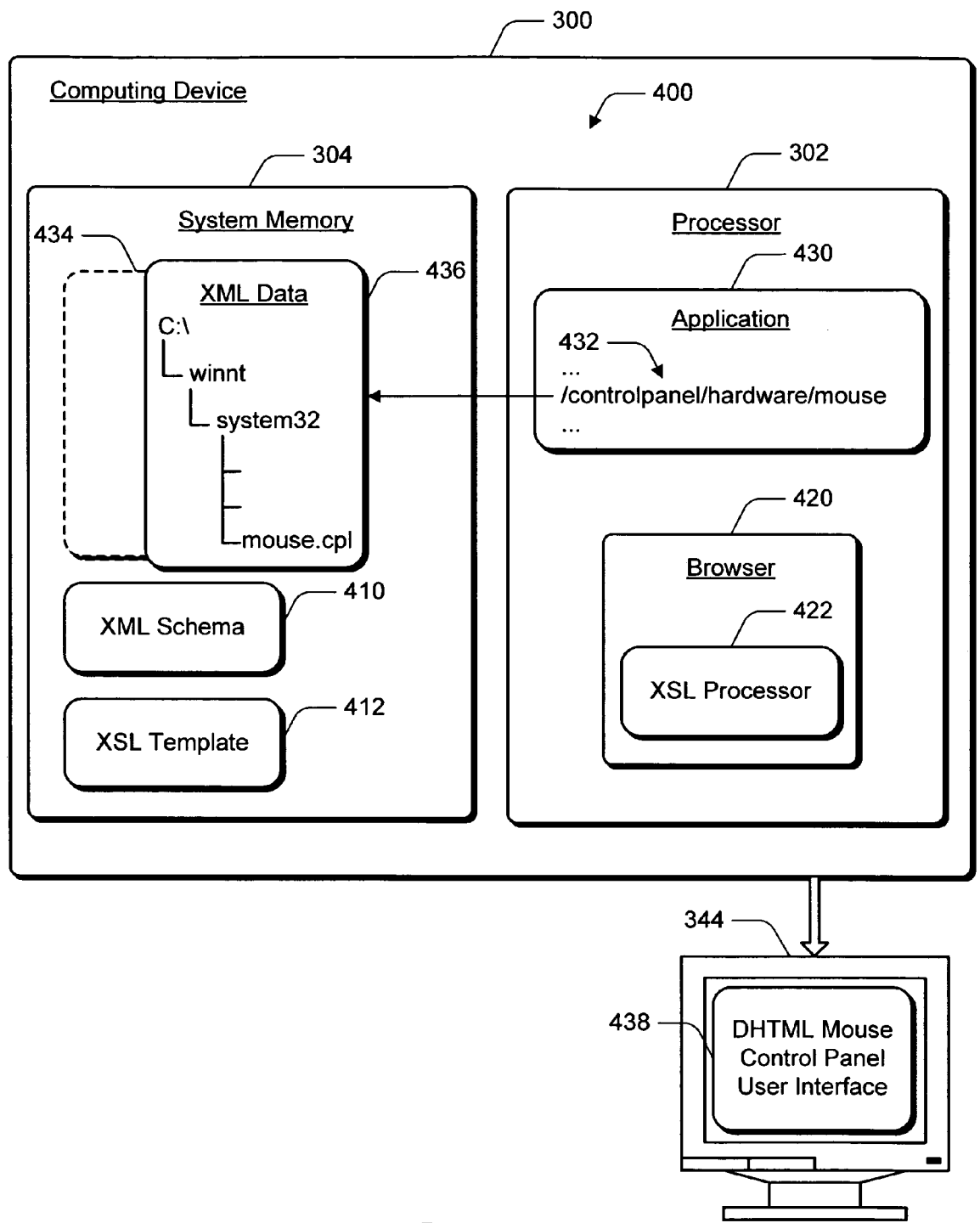

FIGS. 4C and 4D illustrate the extensibility of utilizing a namespace navigation architecture to invoke independent XML data files to define a UI. In FIG. 4C, Application 430 executes on processor 302 and has a namespace reference link 432 to XML data file 434 located in memory 304 at a file space location c:\winnt\system32\main.cpl. The XML data file 434 contains mouse control panel UI settings and controls.

When the application 430 is executed on processor 302, browser 420 processes the XML data 434 with the XSL template 412 at the XSL processor 422 to render a DHTML mouse control panel UI document 424 on display 344. The DHTML document 424 forming the mouse control panel UI incorporates the mouse control panel settings and controls located in the XML data file 434.

FIG. 4D illustrates that the XML data file 434 has been replaced with a new XML data file 436 which is located in memory 304 at location c:\winnt\system32\mouse.cpl. This new memory location differs from the file space location of the now superseded XML data file 434. When the application 430 is again executed on processor 302, the browser 420 processes the XML data 436 with the XSL template 412 at the XSL processor 422 to render a new DHTML mouse control panel UI document 438 on display 344.

The example illustrated in FIGS. 4C and 4D shows that a designer or systems programmer can dynamically modify a UI simply by changing the description of the UI in the XML data file that defines the UI. The example also shows that the abstraction of a system's settings and controls into a namespace navigation architecture eliminates the need for application and systems programmers to have to hard-code file space locations into software applications. Specifically, application 430 is able to call a data file containing the mouse control panel settings and controls with the namespace reference link 432 even after the XML data is modified and after the data file is moved to a new location in memory 304 (FIG. 4C to FIG. 4D).

Figure 5:
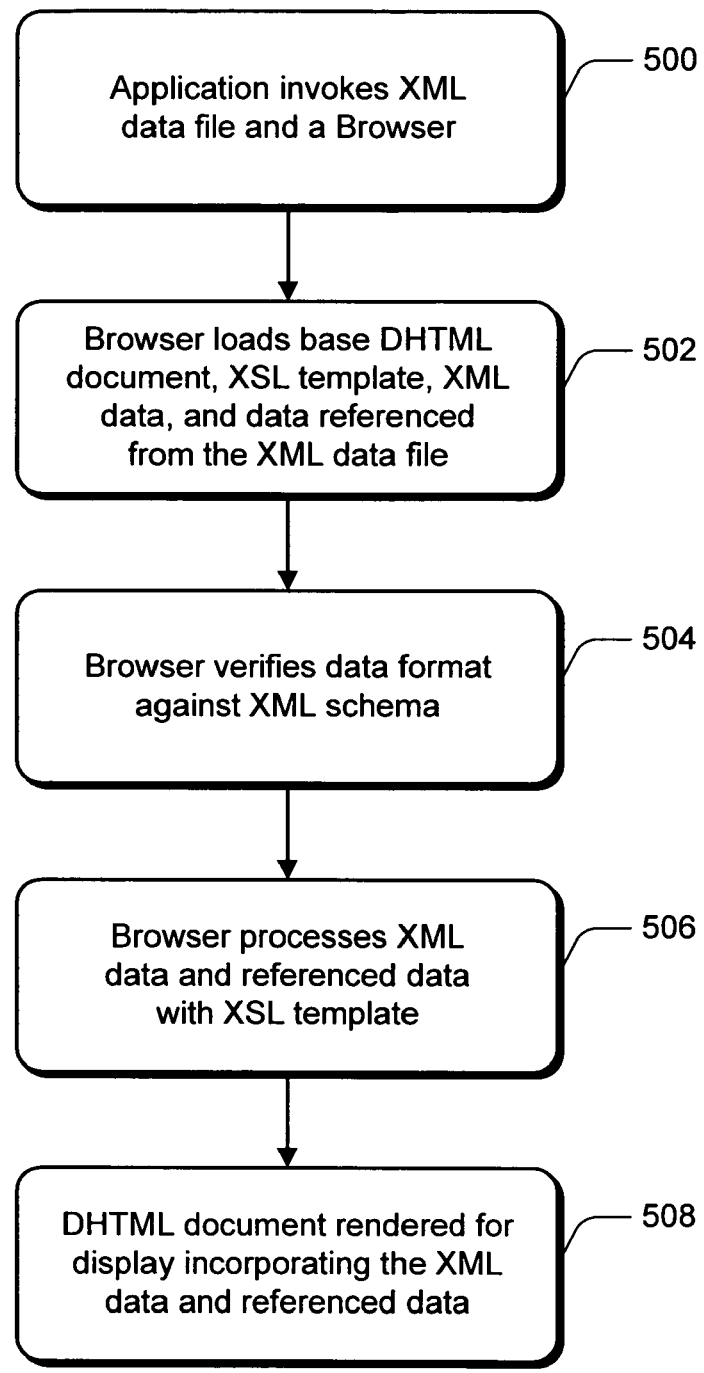
FIG. 5 is a flow diagram that describes steps in an exemplary data presentation method.

FIG. 5 shows a method for generating and rendering data with the data presentation system shown in FIGS. 4A-4B. The method is implemented, and the steps are performed, in software. At step 500, an application executing on a computing device processor invokes an XML data file and a browser. The XML data file references and incorporates other independent data file(s).

In response to executing the application, the browser loads a base DHTML document, an XSL template, the XML data, and the referenced data at step 502. The base DHTML document initiates the browser to load the XSL template and the XML data file and then generates a DHTML document from the XML data using the XSL template. At step 504, the browser verifies that the data format is a valid representation of an XML schema's specified content. At step 506, after verifying the data format, the browser processes the XML data and the referenced data with the XSL template. A resultant DHTML document is rendered at a computing device display at step 508. The resultant DHTML document incorporates the XML data invoked by the application at the initial step 500 and incorporates the data referenced by the XML data file.

Control Panel Hierarchy

Figure 6:
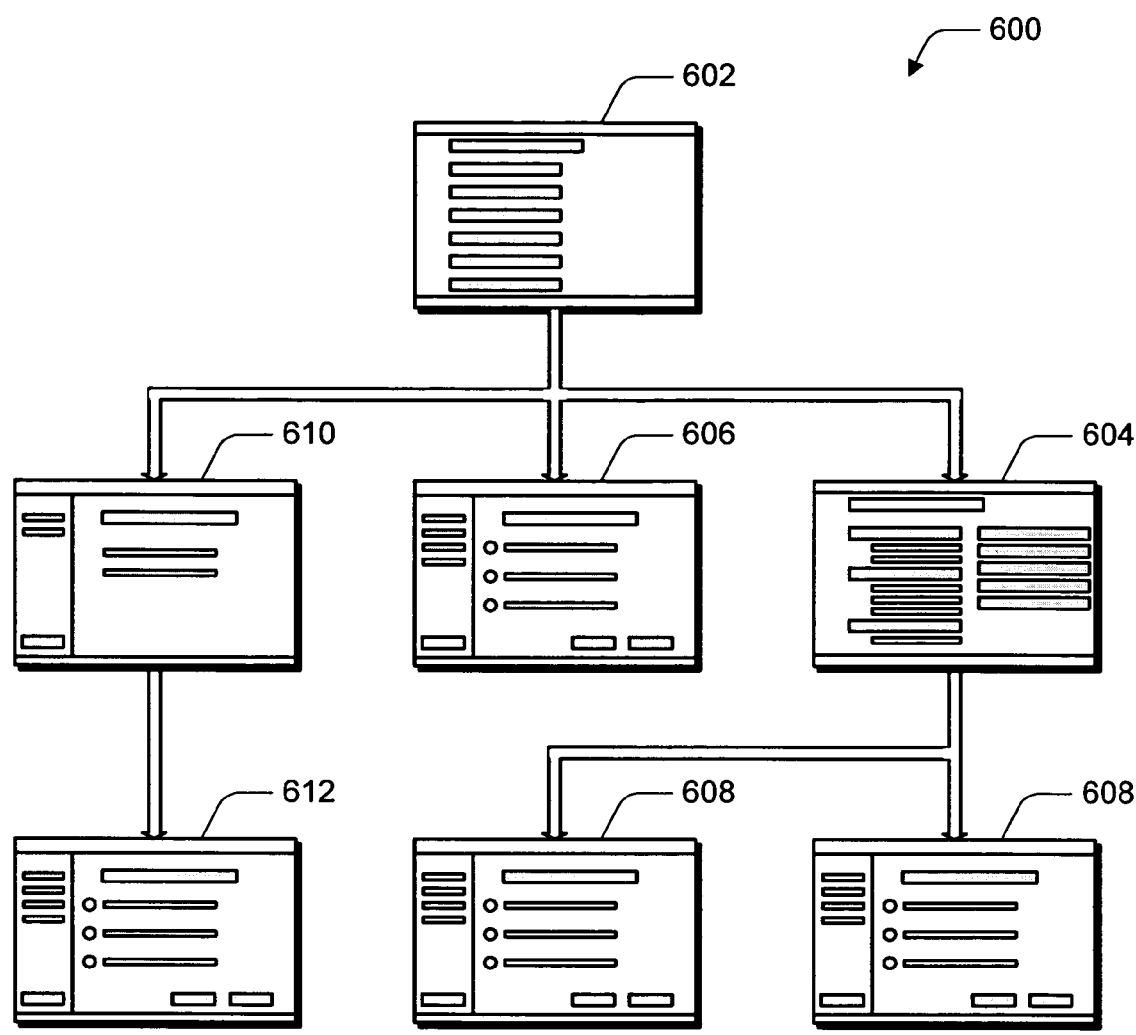
FIG. 6 is a diagram illustrating the structure of a control panel hierarchy.

FIG. 6 illustrates an overall structure of a control panel hierarchy 600. The control panel pages are DHTML documents rendered with the data presentation system shown in FIGS. 4A-4B. Navigation pages 602 and 604 have prompts, integrated help features, and selectable namespace navigation links to groups of system settings and controls at task pages 606 and 608. Task pages 606 and 608 have selectable namespace navigation links to facilitate a user when changing aspects of a computing device's system settings and controls, to include system operation and display presentation.

A home page 610 is also a navigation page from which a user can select a namespace navigational link to a task page 612. A home page 610 is a user starting point for a group of closely related system's settings and/or controls. A home page generally contains only namespace navigation links to individual settings or controls on a task page. Furthermore, a home page also includes status content to inform a user of the system status, a current setting, or other content associated with the particular system setting and/or control on a particular home page.

By organizing related settings and controls together on control panel pages 602 through 612 in the control panel hierarchy 600 according to usability factors, and using control-orientated terminology, a user intuitively understands the system's settings and the associated controls. The organization of the control panel hierarchy 600 allows for cross-linking and multiple control panel page access to system settings and the associated controls wherever a user might look for a particular setting and/or control. Because each setting and control is written as an individual ActiveX control embedded in a DHTML page, the same setting and/or control can easily be made available at multiple logical control panel pages.

Help features are integrated at the control panel pages to present help information that is contextually related to the particular control panel page currently rendered for display. A search for a particular help topic generates selectable links that direct a user to the appropriate setting task on a particular control panel page.

Control Panel User Interface

Figure 7A:
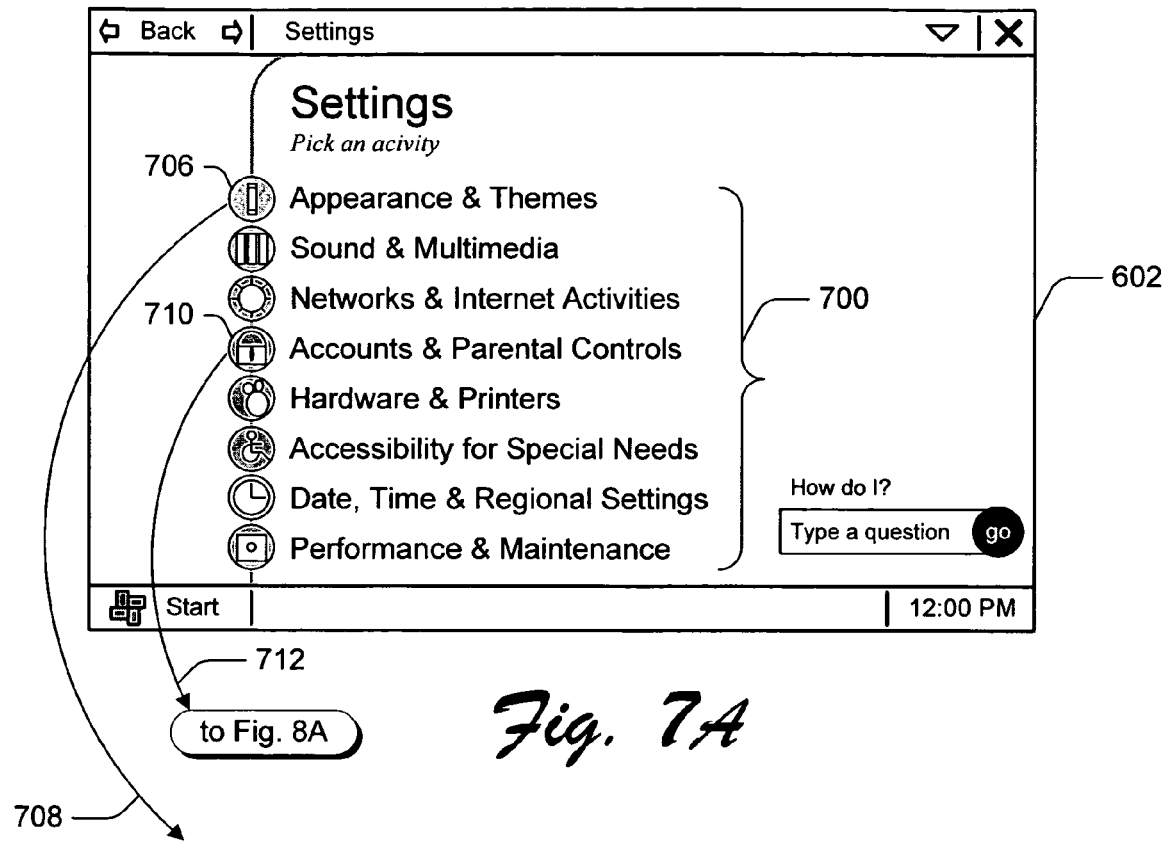
FIG. 7A illustrates an exemplary control panel user interface.
Figure 7B:
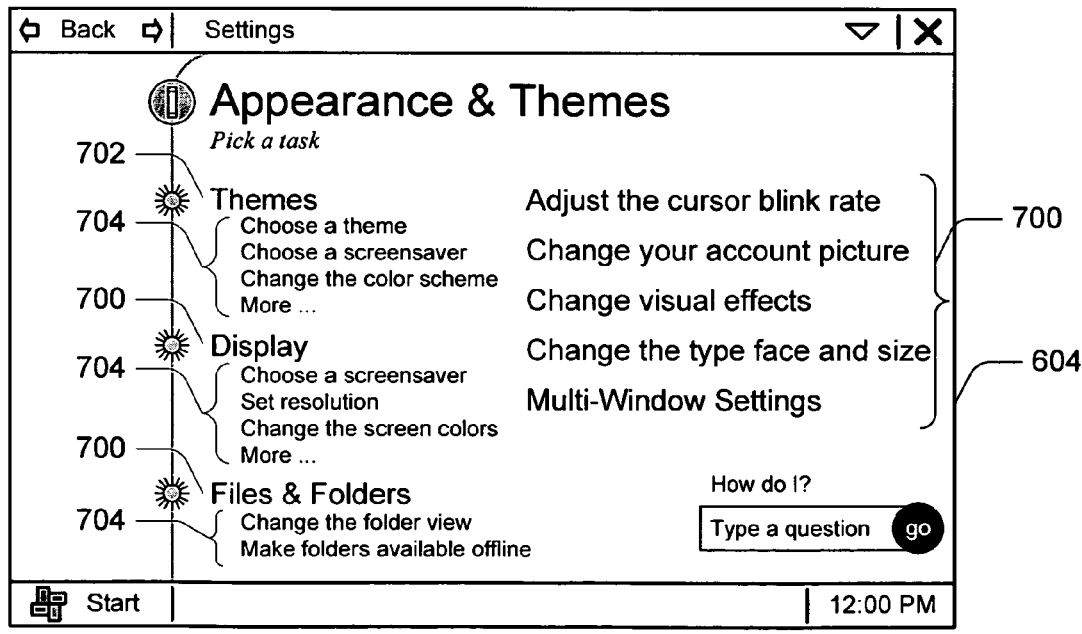
FIG. 7B illustrates a control panel user interface accessible via the control panel user interface illustrated in FIG. 7A.

FIGS. 7A and 7B illustrate examples of a DHTML document generated by the data presentation system 400 shown in FIGS. 4A-4D. Control panel navigation pages 602 and 604 are shown having selectable namespace navigation links 700 and 702. Control Panel navigation page 604 (FIG. 7B) also shows selectable namespace sub-navigation links 704. Each selectable navigation link 700, 702, and 704 is a node link in a namespace that is generated dynamically. A namespace is a hierarchy of nodes similar to that of a URL (universal resource locator) and each node in a namespace is similar to an element in the URL path. A node is identified by its "ID" which is simply the name of the displayed selectable navigation link on the control panel pages 602 and 604.

The root node of a namespace navigation link is the ID of the navigation link. In FIG. 7A, the root node of the namespace for control panel 602 is ID="ControlPanel". Any node in the namespace architecture (e.g., selectable links 700, 702, and 704) is uniquely identified by its full path name from the root node. Node link 706 in FIG. 7A is identified by the path name "/ControlPanel/Settings/AppearanceThemes". Node link 702 in FIG. 7B is identified by the path name "/ControlPanel/Settings/AppearanceThemes/Themes".

FIG. 7A shows that specific node link 706, which identifies namespace node "/ControlPanel/Settings/AppearanceThemes", navigates through the namespace architecture to render Control Panel page 604 (FIG. 7B) at a computing device display as indicated by arrow 708. FIG. 7A also shows that node link 710, which identifies node "/ControlPanel/Settings/AccountsParentalControls", navigates through the namespace architecture to initiate rendering Control Panel page 610 (FIG. 8A) at a computing device display as indicated by arrow 712.

Figure 8A:
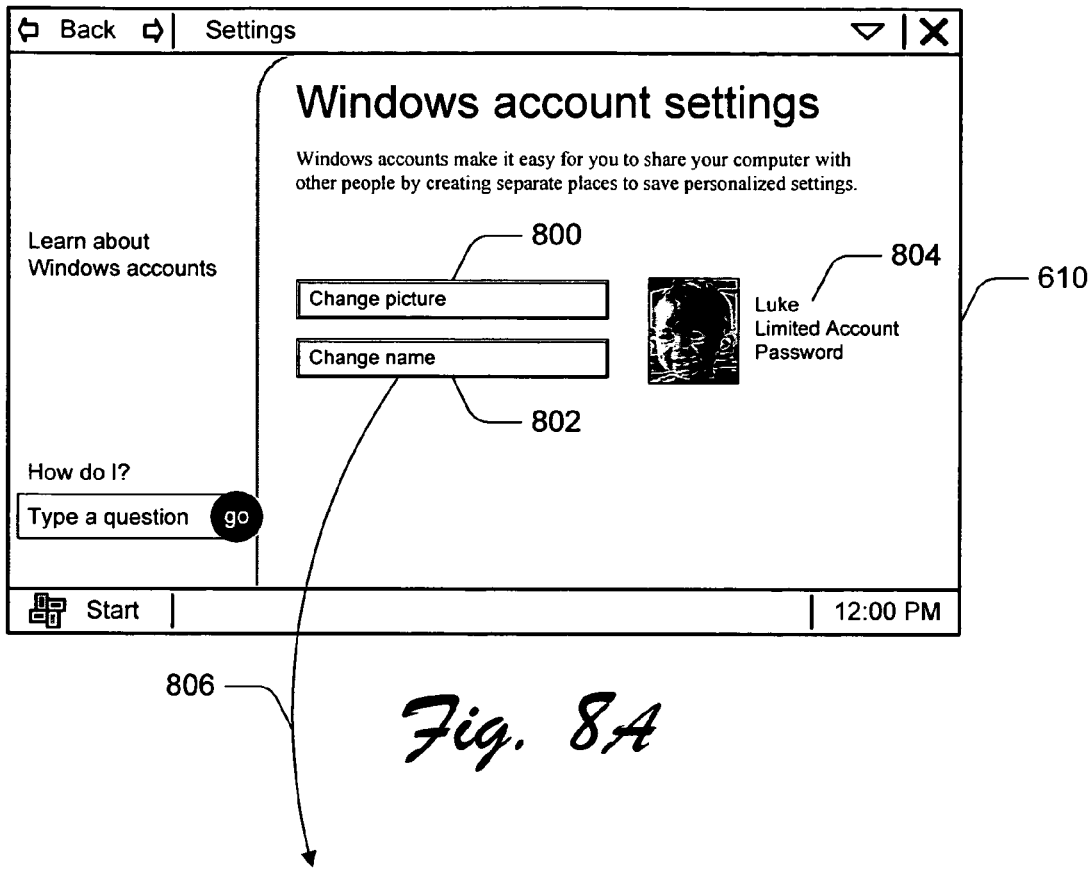
FIG. 8A illustrates an exemplary control panel user interface.
Figure 8B:
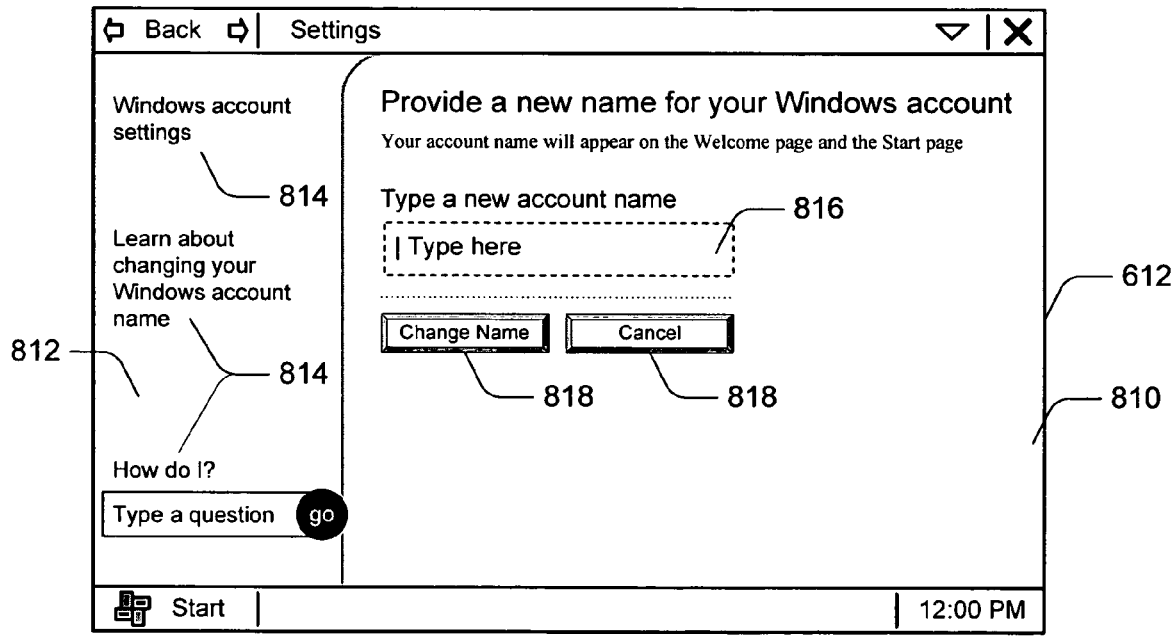
FIG. 8B illustrates a control panel user interface accessible via the control panel user interface illustrated in FIG. 8A.

FIGS. 8A and 8B illustrate examples of a DHTML document generated by the data presentation system 400 shown in FIGS. 4A-4D. FIG. 8A illustrates control panel home page 610 in the control panel hierarchy 600. The home page 610 is shown having two individual setting namespace node links 800 and 802 to task pages. Home page 610 also shows status content 804 to inform a user of the current account settings. Selecting node link 802 (i.e., "Change name") navigates through the namespace architecture to render control panel task page 612 (FIG. 8B) at a computing device display as indicated by arrow 806.

FIG. 8B illustrates a control panel task page 612. The user interface has a primary area 810 (the right-side pane) and a secondary area 812 (the left-side pane). The primary area 810 is a DHTML page dynamically created using source HTML or independent XML data and hosting ActiveX controls, some of which are exposed through "Windows"-brand Management Instrumentation (WMI). The presentation system 400 hosts the DHTML page and uses the source HTML or independent XML data to construct the secondary area 812. The secondary area 812 displays help content 814 that is selectable by a user. The primary area 810 is presented to assist a user in completing a particular task. The primary area 810 displays a dynamically generated task 816, "Type a new account name", that is a link within the namespace navigation architecture. The primary area 810 also presents the user with confirmation buttons 818, "Change Name" and "Cancel", to either enact or cancel a setting change.

Some "Windows"—brand control panels that exist in the Win32 user interface format are more beneficial to a user in the current format than they would be if presented in the DHTML format. In such a case, a Win32 control panel can be incorporated into the control panel hierarchy 600 (FIG. 6) for access by a user. In addition, third party control panel user interfaces can be incorporated into the control panel hierarchy 600.

Control Panel XML Schema Document

The following XML schema (i.e., item 410 in FIG. 4A-4D) defines the namespace for Control Panel and specifies the elements and attributes allowed for the control panel pages illustrated in FIGS. 7A-7B and 8A-8B in the control panel hierarchy 600 shown in FIG. 6. Each Control Panel namespace node in the schema 410 is represented by a CPNS node (control panel namespace node) element in an XML data document (i.e., item 414 in FIGS. 4A-4D).

```xml
<?xml version="1.0"?>
<Schema name="ms-ControlPanel" xmlns="urn:schemas-microsoft-com:xml-data"
        xmlns:dt="urn:schemas-microsoft-com:datatypes">
    <!-- ID is the name of this node, no two siblings can have the same ID -->
    <AttributeType name="ID" dt:type="nmtoken" required="yes"/>
    <!-- access permissions -->
    <AttributeType name="PERMISSIONS" dt:type="enumeration"
        dt:values="owner child guest all"/>
    <!-- extensible implies that this node can have children nodes -->
    <AttributeType name="EXTENSIBLE" dt:type="enumeration"
        dt:values="yes no"/>
    <!-- replaceable implies that this node can be replaced by another node -->
    <AttributeType name="REPLACEABLE" dt:type="enumeration"
        dt:values="yes no"/>
    <!-- how many children of this node will be exposed in lists -->
    <AttributeType name="NUMEXPOSED" dt:type="int" dt:min="0"/>
    <!-- priority amongst sibling nodes, 0 is lowest priority, 1 is highest -->
    <AttributeTypename="PRIORITY" dt:type="float" dt:min="0.0"
        dt:max="1.0"/>
    <!-- Extensions to the ControlPanel namespace can be made by specifying
    the MOUNTPATH attribute on a root CPNSNode in an XML file (A root
    CPNSNode is one which does not have another CPNSNode as its parent).
    The root CPNSNode is then attached as the child node of the node
    specified by the MOUNTPATH. MOUNTPATH attributes on a non-root
    CPNSNode are ignored. -->
    <AttributeTypename="MOUNTPATH"   dt:type="string"
    required="yes"/>
    <!-- The following tag names are in sync with the command presentation
    schema tags. This is for convenience and to reflect the fact that these tags
    are used as is while generating the command presentation XML file. -->
    <ElementType name="Title"          content="textOnly"/>
    <ElementType name="ShortTitle"     content="textOnly"/>
    <ElementType name="Description"    content="textOnly"/>
    <ElementType name="ToolTip"        content="textOnly"/>
    <ElementType name="Image"          content="textOnly"/>
    <ElementType name="Target"         content="textOnly"/>
    <ElementType name="SearchTarget"   content="textOnly"/>
    <ElementType name="SearchKey"      content="textOnly"/>
    <!-- Control Panel specific tags -->
    <ElementType name="Directive"      content="textOnly"/>
    <ElementType name="SeeAlso"        content="textOnly"/>
    <ElementType name="TellMeMore"     content="textOnly"/>
    <ElementType name="ContentHTML"    content="textOnly"/>
    <!-- Control Panel Namespace node -->
    <ElementType name="CPNSNode">
        <attribute type="ID"/>
        <attribute type="PERMISSIONS"         default="all"/>
        <attribute type="EXTENSIBLE"          default="no"/>
        <attribute type="REPLACEABLE"         default="no"/>
        <element type="Title"                 minOccurs="0" maxOccurs="1"/>
        <element type="ShortTitle"            minOccurs="0" maxOccurs="1"/>
        <element type="Description"           minOccurs="0" maxOccurs="1"/>
        <element type="Tooltip"               minOccurs="0" maxOccurs="1"/>
        <element type="Image"                 minOccurs="0" maxOccurs="1"/>
        <element type="Target"                minOccurs="0" maxOccurs="1"/>
        <element type="SearchTarget"          minOccurs="0" maxOccurs="1"/>
        <element type="Directive"             minOccurs="0" maxOccurs="1"/>
        <element type="ContentHTML"           minOccurs="0" maxOccurs="1"/>
        <element type="CommandManifest"       minOccurs="0" maxOccurs="1"/>
        <element type="SearchKey"             minOccurs="0" maxOccurs="*"/>
        <element type="SeeAlso"               minOccurs="0" maxOccurs="*"/>
        <element type="TellMeMore"            minOccurs="0" maxOccurs="*"/>
        <!-- Recursively include nodes -->
        <element type="CPNSNode"              minOccurs="0" maxOccurs="*"/>
    </ElementType>
    <!-- CPNSNode -->
</Schema>
```

The attribute and element types specified in the XML schema document above are described following:

AttributeType "MOUNTPATH" defines an attribute on a root CPNSNode (control panel namespace node) in an XML file that can be utilized to specify an extension to the ControlPanel namespace.

Attribute type "ID" defines a control panel namespace identifier.

Attribute type "PERMISSIONS" defines access permission for the setting. The default value is (ALL), but some categories of users may be denied from changing certain system settings.

Attribute type "EXTENSIBLE" designates that the control panel namespace node will not have any children nodes. The default value is (NO) to define whether or not a 3rd party can add children to a particular node/branch of the taxonomy.

Attribute type "REPLACEABLE" designates that the control panel namespace node cannot be replaced by another node. The default value is (NO) to define whether or not a particular node/branch is completely replaceable in the future.

ElementType "Title" defines the name of the node, page, or branch that appears in the UI.

ElementType "ShortTitle" defines a shorter version of "Title".

ElementType "Description" defines, in plain text, the function of a node.

ElementType "ToolTip" defines the ToolTip text for a node link to this page.

ElementType "Image" defines an image to be displayed on a page.

ElementType "Target" defines the navigation target or the command target for this node.

ElementType "SearchTarget" defines the page to navigate to for a search.

ElementType "SearchKey" defines keywords that describe the content of this page that are used in a search.

ElementType "Directive" defines UI text that tells the user what to do on this page.

ElementType "SeeAlso" defines links to related nodes and branches of the taxonomy.

ElementType "TellMeMore" defines links to help topics that are related to this node or branch.

ElementType "ContentHTML" defines the location of the actual HTML file which appears in the content pane.

ElementType "CPNSNode" defines the data as a control panel namespace node.

Element type "CommandManifest" defines the location of the file which defines the commands for this page.

Although embodiments of the data presentation system have been described in language specific to structural features and/or methods, it is to be understood that the subject of the appended claims is not necessarily limited to the specific features or methods described. Rather, the specific features and methods are disclosed as exemplary implementations of the methods and systems for dynamically creating user interfaces.

The invention claimed is:

1. One or more computer readable media, having stored thereon a data file, said data file comprising:
   an identifier attribute that identifies an extensible markup language (XML) data structure which defines a user interface (UI), the identifier attribute intuitively identifying the data as user interface data;
   an identifier element that identifies the XML data structure as a navigable node in a navigation architecture, the navigable node labeled as the identifier attribute;
   an extending attribute that defines whether the XML data structure will be an extension to an existing navigable node in the navigation architecture;
   a permissions attribute that defines a user access permission to the XML data structure;
   an extensible attribute that designates that the navigable node will not have any children nodes in the navigation architecture;
   a replaceable attribute that designates that the navigable node cannot be replaced by another navigable node in the navigation architecture;
   a title element that defines a name for the navigable node to be displayed on the UI, the name being different than the identifier attribute;
   a short title element that defines a second name for the navigable node, the second name being a shorter version of the title element name;
   a description element that defines a function of the navigable node;
   a textual element that defines text for a tool tip, the text configured to be displayed on the UI;
   an image element that defines an image to be displayed on the UI;
   a target element that defines a navigation target to the navigable node;
   a search target element that defines a navigable node for a searching UI;
   a keywords element that defines one or more words on the UI, the one or more words being identified as search targets for the UI;
   a directive element that defines text to be displayed on the UI, the text describing to a user what actions can be initiated on the UI;
   a relational element that defines one or more reference links to one or more related UIs, the one or more reference links being a subset of navigable nodes in a navigation architecture;
   a help element that defines one or more reference links to one or more help topics that are related to the UI, the one or more reference links being a subset of navigable nodes in a navigation architecture;
   a file element that defines a location of hypertext markup language (HTML) data that is configured to be displayed on the UI; and
   a second file element that defines a location of a commands file, the commands file defining commands to be displayed on the UI.

2. A control panel user interface (UI) presentation system, comprising:
   an extensible markup language (XML) data file having XML data configured to define a control panel UI;
   a second data file having secondary data configured to further define the control panel UI;
   the XML data file having a reference link to the second data file;
   a browser to process the XML data and the second data to dynamically generate the control panel UI, the control panel UI data in the XML data file including:
      an identifier attribute that identifies the XML data as user interface data;
      an identifier element that identifies the XML data file as a navigable node in a navigation architecture, the navigable node labeled as the identifier attribute;
      an extending attribute that defines whether the XML data file will be an extension to an existing navigable node in the navigation architecture;
      a permissions attribute that defines a user access permission to the XML data file;
      an extensible attribute that designates that the navigable node will not have any children nodes in the navigation architecture;
      a replaceable attribute that designates that the navigable node cannot be replaced by another navigable node in the navigation architecture;
      a title element that defines a name for the navigable node to be displayed on the UI, the name being different than the identifier attribute;

a short title element that defines a second name for the navigable node, the second name being a shorter version of the title element name;

a description element that defines a function of the navigable node;

a textual element that defines text for a tool tip, the text configured to be displayed on the UI;

an image element that defines an image to be displayed on the UI;

a target element that defines a navigation target to the navigable node;

a search target element that defines a navigable node for a searching UI;

a keywords element that defines one or more words on the UI, the one or more words being identified as search targets for the UI;

a directive element that defines text to be displayed on the UI, the text describing to a user what actions can be initiated on the UI;

a relational element that defines one or more reference links to one or more related UIs, the one or more reference links being a subset of navigable nodes in a navigation architecture;

a help element that defines one or more reference links to one or more help topics that are related to the UI, the one or more reference links being a subset of navigable nodes in a navigation architecture;

a file element that defines a location of hypertext markup language (HTML) data that is configured to be displayed on the UI; and a second file element that defines a location of a commands file, the commands file defining commands to be displayed on the UI.

3. A control panel user interface (UI) presentation system as recited in claim 2, further comprising an XML schema configured to define a format of the control panel UI data in the XML data file and in the second data file.

4. A control panel user interface (UI) presentation system as recited in claim 2, further comprising an extensible stylesheet language (XSL) template wherein the browser has an XSL processor to process the XML data and the second data to dynamically generate the control panel UI.

5. A control panel user interface (UI) presentation system as recited in claim 2, wherein the control panel UI is a dynamically generated hypertext markup language (HTML) document.

6. A control panel user interface (UI) presentation system as recited in claim 2, wherein the browser renders the control panel UI, the control panel UI incorporating the control panel UI data contained in the XML data file and in the second data file.

7. A control panel user interface (UI) presentation system as recited in claim 2, wherein the reference link is a subset of navigable nodes in a navigation architecture, the reference link being configured to intuitively describe the second data.

8. A control panel user interface (UI) presentation system, comprising:

an extensible markup language (XML) data file having data configured to define a control panel UI;

one or more secondary data files having control panel UI data configured to further define the control panel UI;

the XML data file having a reference link to the one or more secondary data files;

an XML schema configured to define a format of the control panel UI data in the XML data file and in the one or more secondary data files;

an extensible stylesheet language (XSL) template;

a browser having an XSL processor to process the control panel UI data with the XSL template to dynamically generate the control panel UI;

the control panel UI data in the XML data file and in the one or more secondary data files including:

an identifier attribute that identifies the XML data as user interface data;

an identifier element that identifies the XML data file as a navigable node in a navigation architecture, the navigable node labeled as the identifier attribute;

an extending attribute that defines whether the XML data file will be an extension to an existing navigable node in the navigation architecture;

a permissions attribute that defines a user access permission to the XML data file;

an extensible attribute that designates that the navigable node will not have any children nodes in the navigation architecture;

a replaceable attribute that designates that the navigable node cannot be replaced by another navigable node in the navigation architecture;

a title element that defines a name for the navigable node to be displayed on the UI, the name being different than the identifier attribute;

a short title element that defines a second name for the navigable node, the second name being a shorter version of the title element name;

a description element that defines a function of the navigable node;

a textual element that defines text for a tool tip, the text configured to be displayed on the UI;

an image element that defines an image to be displayed on the UI;

a target element that defines a navigation target to the navigable node;

a search target element that defines a navigable node for a searching UI;

a keywords element that defines one or more words on the UI, the one or more words being identified as search targets for the UI;

a directive element that defines text to be displayed on the UI, the text describing to a user what actions can be initiated on the UI;

a relational element that defines one or more reference links to one or more related UIs, the one or more reference links being a subset of navigable nodes in a navigation architecture;

a help element that defines one or more reference links to one or more help topics that are related to the UI, the one or more reference links being a subset of navigable nodes in a navigation architecture;

a file element that defines a location of hypertext markup language (HTML) data that is configured to be displayed on the UI; and a second file element that defines a location of a commands file, the commands file defining commands to be displayed on the UI.

9. A control panel user interface (UI) presentation system as recited in claim 8, wherein the control panel UI is a dynamically generated hypertext markup language (HTML) document.

10. A control panel user interface (UI) presentation system as recited in claim 8, wherein the browser renders the control panel UI, the control panel UI incorporating the control panel UI data contained in the XML data file and in the one or more secondary data files.

11. A control panel user interface (UI) presentation system as recited in claim 8, wherein the reference link is a subset of navigable nodes in a navigation architecture, the reference link being configured to intuitively describe the control panel UI data in the one or more secondary data files.

12. A control panel user interface (UI) presentation system comprising:
- means for invoking an XML data file having XML data configured to define a control panel UI and having a reference link to reference a second data file having secondary data configured to further define the control panel UI;
- means for loading the XML data and the secondary data into a browser;
- means for verifying that the XML data and the secondary data is a valid representation of an XML schema, the XML schema defining a format of the XML data and of the secondary data;
- means for processing the XML data and the secondary data with an XML template to dynamically generate the control panel UI, the XML data and in the secondary data including:
  - an identifier attribute that identifies the XML data as user interface data;
  - an identifier element that identifies the XML data file as a navigable node in a navigation architecture, the navigable node labeled as the identifier attribute;
  - an extending attribute that defines whether the XML data file will be an extension to an existing navigable node in the navigation architecture;
  - a permissions attribute that defines a user access permission to the XML data file;
  - an extensible attribute that designates that the navigable node will not have any children nodes in the navigation architecture;
  - a replaceable attribute that designates that the navigable node cannot be replaced by another navigable node in the navigation architecture;
  - a title element that defines a name for the navigable node to be displayed on the UI, the name being different than the identifier attribute;
  - a short title element that defines a second name for the navigable node, the second name being a shorter version of the title element name;
  - a description element that defines a function of the navigable node;
  - a textual element that defines text for a tool tip, the text configured to be displayed on the UI;
  - an image element that defines an image to be displayed on the UI;
  - a target element that defines a navigation target to the navigable node;
  - a search target element that defines a navigable node for a searching UI;
  - a keywords element that defines one or more words on the UI, the one or more words being identified as search targets for the UI;
  - a directive element that defines text to be displayed on the UI, the text describing to a user what actions can be initiated on the UI;
  - a relational element that defines one or more reference links to one or more related UIs, the one or more reference links being a subset of navigable nodes in a navigation architecture;
  - a help element that defines one or more reference links to one or more help topics that are related to the UI, the one or more reference links being a subset of navigable nodes in a navigation architecture;
  - a file element that defines a location of hypertext markup language (HTML) data that is configured to be displayed on the UI; and
  - a second file element that defines a location of a commands file, the commands file defining commands to be displayed on the UI.

13. A method for rendering a control panel user interface (UI) comprising:
- invoking an XML data file having XML data configured to define a control panel UI and having a reference link to reference a second data file having second data configured to further define the control panel UI;
- loading the XML data and the second data into a browser;
- verifying that the XML data and the second data is a valid representation of an XML schema, the XML schema defining a format of the XML data and of the second data;
- processing the XML data and the second data with an XML template to dynamically generate the control panel UI, the XML data and the second data including:
  - an identifier attribute that identifies the XML data as user interface data;
  - an identifier element that identifies the XML data file as a navigable node in a navigation architecture, the navigable node labeled as the identifier attribute;
  - an extending attribute that defines whether the XML data file will be an extension to an existing navigable node in the navigation architecture;
  - a permissions attribute that defines a user access permission to the XML data file;
  - an extensible attribute that designates that the navigable node will not have any children nodes in the navigation architecture;
  - a replaceable attribute that designates that the navigable node cannot be replaced by another navigable node in the navigation architecture;
  - a title element that defines a name for the navigable node to be displayed on the UI, the name being different than the identifier attribute;
  - a short title element that defines a second name for the navigable node, the second name being a shorter version of the title element name;
  - a description element that defines a function of the navigable node;
  - a textual element that defines text for a tool tip, the text configured to be displayed on the UI;
  - an image element that defines an image to be displayed on the UI;
  - a target element that defines a navigation target to the navigable node;
  - a search target element that defines a navigable node for a searching UI;
  - a keywords element that defines one or more words on the UI, the one or more words being identified as search targets for the UI;
  - a directive element that defines text to be displayed on the UI, the text describing to a user what actions can be initiated on the UI;
  - a relational element that defines one or more reference links to one or more related UIs, the one or more reference links being a subset of navigable nodes in a navigation architecture;
- a help element that defines one or more reference links to one or more help topics that are related to the UI, the one or more reference links being a subset of navigable nodes in a navigation architecture;

a file element that defines a location of hypertext markup language (HTML) data that is configured to be displayed on the UI; and a second file element that defines a location of a commands file, the commands file defining commands to be displayed on the UI.

14. A method for rendering a control panel user interface (UI) as recited in claim 13 further comprising displaying the control panel UI, the control panel UI incorporating the XML data and the second data for display.

15. A method for rendering a control panel user interface (UI) as recited in claim 13, wherein the reference link is a subset of navigable nodes in a navigation architecture, the reference link being configured to intuitively describe the second data.

16. One or more computer readable media comprising computer executable instructions that, when executed, direct a computing system to perform the method of claim 13.

* * * * *